United States Patent Office 3,368,990
Patented Feb. 13, 1968

3,368,990
ACRYLIC LACQUERS COMPRISING CARBON BLACK, ORGANIC COPPER COMPOUND AND AROMATIC DIAMINE
Philip H. Goulston, Peabody, Mass., assignor to Cabot Corporation, Boston, Mass., a corporation of Delaware
No Drawing. Continuation-in-part of application Ser. No. 475,008, July 26, 1965, which is a continuation-in-part of application Ser. No. 234,248, Oct. 30, 1962. This application Jan. 27, 1967, Ser. No. 612,092
14 Claims. (Cl. 260—23)

ABSTRACT OF THE DISCLOSURE

Carbon black pigmented lacquer based on thermoplastic acrylic resins as known in the art and comprising as an adjuvant therein an organic copper salt such as copper oleate, copper naphthenate, copper acetate and the like and carbon black. The aforesaid salt provides extraordinarily good color development of carbon black pigmentation qualities of such lacquer. Aromatic amines such as the phenylene diamines are also desirable adjuvants in the lacquer compositions of the invention. In general, a black lacquer composition according to the invention will comprise 10 to 50% by weight of resin; about 1 to 6%, based on the weight of lacquer of an aftertreated channel black; 0.5 to 5% of copper, based on the weight of carbon black; and 2 to 20 parts of an aromatic diamine, also based on the weight of carbon black.

Cross reference to related disclosures

This application is a continuation-in-part of copending U.S. application Ser. No. 475,008 filed July 26, 1965 by Philip H. Goulston now abandoned, which in turn is a continuation-in-part of U.S. application Ser. No. 234,248, filed Oct. 30, 1962, now abandoned.

Background of the invention

This invention relates to coatings comprising synthetic resins, specifically acrylic resin-based coatings comprising carbon black as a pigment. The coatings include the type, known as "acrylic lacquers," which find large application in the automotive-coating field.

Solvent type lacquers based upon thermoplastic acrylic resins are well known to the art and presently enjoy a wide range of applications because of their excellent color retention properties together with their exceptional ability to resist abrasion and chemicals. Included among the more important applications and uses which such acrylic type lacquers enjoy today are as automotive finishes, aerosol paints, exterior house paints and interior wall paints. Broadly, the acrylic lacquers of interest here may be defined as essentially non-aqueous or solvent type systems in which the major portion of the resin is a thermoplastic acrylic type resin produced by the polymerization of monomers chosen from the group consisting of acrylic acid, methacrylic acid and their derivatives, with or without minor amounts of other compatible thermoplastic monomers. These resins are generally utilized in granular form in the initial preparation of the lacquers of interest to the present invention. In later letdown stages, the resins are utilized in solution form. Generally, the most widely used solvents for such resins are toluene and xylene. However, other suitable solvents include benzene, butyl acetate, acetone, ethyl acetate, methyl ethyl ketone, methyl isobutyl ketone, cellosolve acetate and many others or compatible mixtures of these. In general the amount of resin in such lacquer systems may vary from about 10% to about 50% of the total lacquer or even somewhat higher in certain cases. Other ingredients which can be included in the acrylic type lacquers of this invention are plasticizers and/or polymeric plasticizers such as polypropylene glycol, and/or other compatible thermo-plastic type resins especially nitrocellulose.

It is well known to those skilled in the art that black is one of the most difficult colors to obtain consistently on a high quality basis in any of the thermoplastic acrylic type lacquers. This is presently believed to be due chiefly to the fact that the carbon black pigment is very difficult to disperse into these systems with optimum color development. For example, when other pigments are involved, good color development may often be obtained simply by grinding the pigment with the resin while same is in solution form. In contrast thereto, various complex procedures are required in order to achieve adequate color development of black pigments in such acrylic lacquers. One of the most common procedures involves initially compounding a portion of the resin in solid form and all of the black on a hot two roll mill in order to achieve an intimate dispersion of the ingredients. Thereafter, the material is sheeted from the mill, allowed to cool and cut up into small "chips." In present practice the "chip" generally comprises from about 10% to about 30% black based on the total weight of the chip and from about 40% to about 85% resin components with the remaining materials usually being plasticizers. These "chips" are subsequently dissolved in a suitable solvent in a "let down" stage during which other ingredients including additional resin—generally in solution form—are added. However, even in the above-mentioned procedure, serious flocculation of the black will occur in the letdown step unless a nitrocellulose resin is included in the initial compounding step. Thus, present procedures do not permit the obtaining of a thermopalstic acrylic type black lacquer of satisfactory color wherein an acrylic is the sole resin. It will be obvious then that any method whereby a carbon black pigment may be incorporated into a predominantly or wholly thermoplastic acrylic type lacquer system so as to consistently develop high color jetness therein would be, indeed, a notable contribution to the art.

Summary of the invention

The principal object of the present invention is to provide a black thermoplastic acrylic type lacquer system or formulation of unusually high gloss, color and jetness.

Another more specific object of our invention is to provide a black, predominantly or wholly acrylic type lacquer system having superior color properties including exceptionally high gloss, which lacquer is especially useful for automotive topcoat finishes.

Other objects and advantages of the present invention will in part appear hereinafter or will in part be obvious to those well skilled in the art.

The above objects and advantages are obtained in accordance with the teachings of my invention by adding a minor amount of organic copper compound and an amine to the black and resin during the step involved in dispersing these ingredients. I have discovered that the addition of the organic copper compound and the amine to the black and resin during the dispersion step not only gives rise to surprisingly superior color properties in the final lacquer but also permits the production of a superior black lacquer in which if desired, the acrylic may be the sole resin.

I have found that the most desirable color development in black acrylic type lacquers produced in accordance with the teachings of my invention is best achieved by the use of an aftertreated channel carbon black as the pigment therein. For example, I have found that good color and jetness in such lacquers is generally obtained when an amount of from about 1 to about 6% and preferably 1 to about 4% by weight based on the total weight of the lacquer of a channel carbon black which has been subjected to a high temperature air aftertreatment step is utilized as the pigment therein. More particularly, I have found that high color, gloss and jetness in such lacquers is best obtained by utilizing as a pigment therein a medium color channel black which is produced by a unique combination of aftertreatment steps including high temperature air aftertreatment together with subsequent treatment of the black with nitric acid or nitric oxides. The particular pigments which I have discovered to be most desirable and the process for producing same are described in detail in U.S. Patent No. 3,226,224, to Merrill E. Jordan and John F. Hardy. Essentially this black is produced by a two step aftertreatment of a specific channel type black. In the first step, a black having an average Electron Microscope particle diameter of at least 15 millimicrons and a porosity below about 200 is subjected to treatment with molecular oxygen to obtain an intermediate product having a porosity value between about 220 to 400. By porosity of a black, we mean the difference obtained by deducting from the nitrogen surface area of a black (determined by the method of Brunouer-Emmett-Teller), that surface area of the black obtained by calculating same from the observed average electron microscope particle diameter according to the following formula:

Square meters per gram = $\frac{60,000}{1.82}$ (Elec. M. particle diameter in angstroms)

The difference obtained is generally believed by those well skilled in the art to be primarily due to the presence of small openings or pores in the surface of the black. The intermediate product so obtained, which has a percent volatile of at least about 8%, is subsequently treated with an aqueous solution of nitric acid or with nitric oxides and dried to produce a product having a percent volatile which is increased by at least about 40% over that of the intermediate product. In the practice of our invention, however, we especially prefer those blacks which have been subsequently subjected to treatment with nitric acid solutions. Hereinafter, the products resulting from the above-mentioned two step aftertreatments will be referred to as 2XA channel blacks and these blacks represent the preferred pigments for the lacquers produced in accordance with the teachings of my invention.

Acrylic resins of the type useful in the present invention include those homopolymers and copolymers prepared by polymerization of acrylate monomers such as the following:

acrylic acid
methacrylic acid
methyl acrylate
ethyl acrylate
n-butyl methacrylate
isobutyl methacrylate
n-tetradecyl methacrylate
n-hexadecyl methacrylate
n-octyl methacrylate
n-lauryl methacrylate
n-hexyl methacrylate
ethyl methacrylate
methyl methacrylate These monomers are merely typical of those known to the art and described in Organic Coating Technology by Payne (Wiley and Sons, New York, 1954). Many other homologs of these monomers can be used in the process of the invention. Advantageously a blend of such monomers is polymerized to give a coating that is appropriate to the use to which a particular lacquer or coating is to be put. For example hardness may sometimes be desirably achieved at the cost of an increased brittleness. More often hardness will be sacrificed to achieve a reduced brittleness. In achieving these property modifications, minor quantities of non-acrylate monomers or other plasticizing agents may be incorporated into the lacquer either in the compounding of the lacquer or by prior chemical or physical incorporation in the resin mass. In any event these resin-formulating strategies and techniques are well known in the art and do not form any part of this invention.

An acrylic resin of commerce useful in the process of the invention comprises 44% 2-ethylhexyl acrylate, 29% methyl methacrylate and 25% hydroxy ethyl methacrylate. Said acrylic polymer has an average molecular weight of about 25,000 to 30,000.

The resin with which the working examples were carried out is an acrylic polymer comprising 10% lauryl methacrylate and 90% methyl methacrylate. The average molecular weight is about 80,000.

Since the essence of my invention resides in the discovery that surprisingly superior color properties may be obtained in lacquer systems wherein a thermoplastic acrylic resin constitutes the sole or at least the major ingredient of the resin, by intimately mixing the resin and black in the presence of a minor amount of an organic compound and an aromatic diamine, various changes in other details of formulation and production may be made by those skilled in the art without departing from the spirit and scope of the invention as defined in the appended claims.

The organic copper compound which I have found most suitable for the practice of my invention is copper oleate. However, other organic compounds may be utilized such as copper acetate, copper naphthenate and others providing they have boiling points which are high enough so that excessive volatilization of the compound does not occur during the milling and compounding procedures involved in the dispersion of the black and resin. Although a significant degree of improvement in color may be obtained by using amounts of the compound sufficient to provide at least 0.5 part of copper per hundred parts of black, nevertheless the best results are obtained when the compound is present together with the amine in amounts sufficient to provide from about 1 to about 3 parts of copper or somewhat more per hundred parts of black.

Many amines especially the aromatic diamines may be utilized together with the copper compounds in the practice of my invention. I especially prefer phenylene diamines, particularly p-phenylene-diamine, since these do not vaporize to any extent at the temperatures involved in making the dispersion nor are they seriously toxic under normal conditions. Obviously when high milling temperatures are involved in the dispersion step, e.g. about 250° F., many amines would vaporize excessively and hence would not be recommended for the practice of my invention. Also, some consideration should be given to the toxicity of the amine in the selection thereof. Accordingly, in the absence of any advantages in the use of a particular amine peculiar to those who may practice my invention, the aromatic diamines and especially p-phenylene-diamine are considered as the preferred embodiment of my invention. Although a significant degree of improvement is noted when the amine is used in amounts as small as about 3 parts per hundred parts of black by weight, the especially preferred range of amine to be used with the copper compound is from about 5 to about 15 parts by weight of the amine per hundred parts by weight of black.

Description of preferred embodiments

In practice, the best results are obtained by adding the copper compound and the amine to the black and resin while the initial dispersion thereof is being effected on a hot two roll mill. Usually, the black and resin are mixed in such proportions so as to provide a concentration of about 20% by weight of the chip of carbon black pigment in the final chip. This represents the total amount of pigment in the final lacquer with additional resin, solvent, and other ingredients being added in the letdown stages. The final lacquer usually contains about 30% solids with the pigment generally representing about 6% of the weight of the solids. The above manner of dispersing the ingredients, e.g. compounding same on a two roll mill, is the most preferred manner of practicing my invention since a high degree of dispersion of high concentrations of black in the final chip may be obtained thereby. Other dispersion techniques may be utilized if desired, such as grinding the ingredients in a ball mill, etc., but although a degree of improvement in color is obtained by using the ingredients of my invention therewith, nevertheless, the optimum color properties in the final lacquer are developed in accordance with the above-mentioned preferred dispersion technique.

In order that those well skilled in the art may better understand my invention and practice same, the following examples are presented. It is to be understood that the examples which follow are illustrative in nature and in no way are they to be construed to limit my invention beyond those limitations imposed by the present specification and by the claims which follow hereinafter.

EXAMPLE I

The chip formulations described in Table 1 were prepared as follows: the ingredients of each formulation were premixed and thereafter banded on a two roll mill; the formulations were then milled for 5 minutes with the roll temperature maintained at about 250° F. The milled material was sheeted off and allowed to cool overnight. It is to be understood, however, that the time of cooling is not critical and may be varied as convenient or desired. Thereafter, the material was again milled on a two roll mill at a roll temperature of about 180° F. for 10 minutes. During this stage, temperature rises of about 50° to 60° F. in the mass are obtained because of the high shear generated. The milled material was then sheeted off, allowed to cool to room temperature and pulverized into fine chips. The plasticizer used in the following formulations was based on butyl benzyl phthalate. Other plasticizers which may be used are those based on dibutyl phthalate, dioctyl phthalate, tricresyl phosphate, and other compatible plasticizers which are well known to those skilled in the art. It has been determined that the variations in the amount of plasticizer as encountered in the following example have no appreciable effect on the color development of the black pigment in acrylic type lacquers.

lacquer prepared from chip formulation No. 708–M. The lower reflectivity readings are considered the most desirable since lower reflectivity indicates greater absorption and darker color. The following data were obtained:

TABLE 2

| Formulation No. | Black | Coloreye Reflectance | | |
|---|---|---|---|---|
| | | X | Y | Z |
| 707–A | 2XA | 143.5 | 131 | 108 |
| 712–M | 2XA | 117.0 | 114.5 | 108.7 |
| 728–O | 2XA | 110.8 | 109.2 | 105.5 |
| 708–M | 2XA | 101.2 | 101.8 | 100.7 |
| 725–O | 2XA | 61.0 | 64.5 | 72.0 |
| 727–O | 2XA | 58.0 | 61.8 | 70.4 |
| 726–O | 2XA | 51.3 | 55.5 | 53.2 |
| 713–M | 2XA | 38.4 | 41.7 | 48.5 |
| 706–A | Black Pearls 2 | 122.0 | 112.0 | 86.6 |
| 710–M | ....do | 93.6 | 90.5 | 82.5 |
| 729–O | ....do | 80.5 | 79.1 | 73.8 |

It will be obvious from the data above that surprisingly improved color properties are obtained by utilizing in the chip sufficient copper oleate to provide about 2.5 parts of copper by weight per hundred parts of black and about 10 parts p-phenylene diamine by weight per hundred parts of the black, especially when the black utilized as a pigment is a 2XA type black. Accordingly, an especially preferred embodiment of my invention involves compounding on a two roll mill the resin component—which represents from about 50% to about 75% by weight of the final chip and—which may be a 100% acrylic resin if desired—together with from about 13 to about 26% by weight of the final chip of a 2XA type black and from 10 to 30% by weight of the black of copper oleate and from 5 to about 15% by weight of the black of p-phenylene diamine.

It should also be mentioned that no flocculation of black was apparent during the letdown stages with chip formulations 713–M, 725–O, 726–O and 727–O, even though each contained only acrylic resins as the resin component. Thus, by practicing my invention, it is no longer necessary to include nitrocellulose as a resin com-

TABLE 1

| Chip Formulation No. | Weight Percent Acrylic Resin in Chip | Percent Plasticizer in Chip | Black | Percent Black in Chip | Copper oleate-parts Cu per 100 parts by weight of black | p-Phenylene-diamine parts per 100 parts by weight of black |
|---|---|---|---|---|---|---|
| 707–A | 75 | 10 | 2XA | 15 | 0 | 0 |
| 712–M | 75.3 | 4.7 | 2XA | 15 | 3.5 | 0 |
| 728–O | 68 | 9.0 | 2XA | 20 | 0 | 15 |
| 708–M | 75 | 6.25 | 2XA | 15 | 2.5 | 0 |
| 725–O | 68 | 6.0 | 2XA | 20 | 2.5 | 5 |
| 727–O | 68 | 3.0 | 2XA | 20 | 2.5 | 20 |
| 726–O | 68 | 5.0 | 2XA | 20 | 2.5 | 10 |
| 713–M | 74.7 | 4.8 | 2XA | 15 | 2.5 | 10 |
| 706–A | 75 | 10.0 | Black Pearls 2* | 15 | 0 | 0 |
| 710–M | 76.2 | 6.3 | ....do | 15 | 2.5 | 0 |
| 729–O | 68 | 5.0 | ....do | 20 | 2.5 | 10 |

*Black Pearls 2 is a high temperature air aftertreated channel black. Black Pearls 2 has a nigrometer scale of about 64, a nitrogen surface area of about 850 square meters per gram and an Electron Microscope particle diameter of about 12 millimicrons.

The above chip formulations were then mixed with additional resin solution and plasticizer in a can together with steel balls and rolled overnight.

The concentration of resin solids in the final lacquers prepared from the above-mentioned chips was about 19.7% by weight of the total lacquer while the concentration of black pigment in each of the final lacquers was about 1.9% by weight of the total lacquer.

The color properties of each of the resulting lacquers were determined on glass panel drawdowns of the black lacquers using the "Coloreye" produced by Instrument Development Laboratories, Inc., of Attleboro, Mass., and described in detail in their "Instruction Manual No. 1000 G for Model D Coloreye."

The "Coloreye" measures light reflectance of a sample compared to a standard at three wavelengths in the visible light spectrum. The standard used in this study was the ponent in the chip formulation in order to avoid flocculation of the pigment in the letdown stages. Obviously, nitrocellulose resin or other compatible resins such as epoxies and the like may be included in minor proportions, e.g. in amounts up to about 20 to 25% of the total resin in either or both the "letdown" ingredients or in the chip ingredients without impairing the superior color properties obtained, when special properties are desired in the final lacquer.

EXAMPLE 2

A chip formulation was prepared in accordance with the procedure of Example 1 and having ingredients similar to chip formulation 713–M of Table 1. However, in contrast to chip formulation 713–M which contained 68% acrylic resin, the chip prepared contained about 53% acrylic resin and about 15% nitrocellulose resin. The chip formulation containing the acrylic and nitrocellulose was then mixed with additional acrylic resin solution and plasticizer in a can together with steel balls and rolled overnight. The concentration of resin solids based on the weight of the final lacquer prepared was about 19.7% with the nitrocellulose representing about 1.4% by weight of the lacquer. The degree of improvement in color properties of the lacquers produced from the chip formulation was substantially similar to that described in Table 2 of Example 1 for the lacquer prepared from the chip formulation 713–M.

EXAMPLE 3

The following chip formulations were prepared in accordance with the procedure set forth in Example 1. All chip formulations of Table 3 contained 2XA type black as the pigment therein.

about 2 to about 20 parts by weight of an aromatic diamine per 100 parts of black.

2. The lacquer of claim 1 wherein the amount of said compound is sufficient to supply from about 1 to about 4 parts of copper by weight per hundred parts of black and wherein the amount of said diamine is from about 5 to about 15 parts by weight of diamine per hundred parts of black.

3. The lacquer of claim 1 wherein the said channel black is produced by the treatment of a channel black having an electron microscope particle diameter of at least 15 millimicrons and a porosity below about 200 with molecular oxygen to produce a product having a porosity between about 220 to about 400 and the subsequent treatment of said product with a substance chosen from the

TABLE 3

| Chip Formulation No. | Weight percent Acrylic Resin in Chip | Percent Plasticizer in Chip | Percent Black in Chip | Copper Oleate, parts Cu per 100 parts by weight of black | Copper Naphthenate, parts Cu per 100 parts by weight of black | Copper Acetate, parts Cu per 100 parts by weight of black | p-Phenylenediamine, parts per 100 parts by weight of black |
|---|---|---|---|---|---|---|---|
| 755-O | 68 | 5.8 | 20 | | | 2.5 | |
| 754-O | 68 | 7.0 | 20 | | 2.5 | | |
| 756-O | 68 | 10.5 | 20 | | | 2.5 | |
| 759-O | 68 | 8.5 | 20 | | | 2.5 | 10 |
| 758-O | 68 | 3.7 | 20 | | 2.5 | | 10 |
| 753-O | 68 | 5.0 | 20 | 2.5 | | | 10 |

The above chip formulations were utilized to prepare lacquers in accordance with the procedure set forth in Example 1. The following "Coloreye" data were obtained for each lacquer using the lacquer prepared from chip formulation 708–M of Example 1 as the standard.

TABLE 4

| Chip Formulation No. | Coloreye Reflectance | | |
|---|---|---|---|
| | X | Y | Z |
| 755-O | 123.0 | 121.0 | 116.5 |
| 754-O | 122.5 | 120.0 | 115.0 |
| 756-O | 113.5 | 112.5 | 111.0 |
| 759-O | 79.4 | 81.8 | 87.2 |
| 758-O | 76.1 | 70.3 | 79.9 |
| 753-O | 56.1 | 59.9 | 67.1 |

The gloss properties of lacquers prepared from the chip formulations of Table 3 and of the lacquer prepared from chip formulation 707–A of Table 1 were also determined since the development of high gloss is considered to be a function of the dispersion of the pigment in the system. High gloss is an essential property of acrylic lacquers especially in view of their wide use as automotive topcoat finishes. The following data were obtained:

group consisting of nitric acid and nitric oxides to increase the volatile content thereof by at least about 40%.

4. The lacquer of claim 1 wherein the resin component consists essentially of thermoplastic type acrylic resins.

5. The lacquer of claim 2 wherein the said copper compound is selected from the group consisting of copper oleate, copper naphthenate, copper acetate, and mixtures thereof and the said diamine is p-phenylene diamine.

6. The lacquer of claim 5 wherein the said copper compound is copper oleate.

7. A composition useful as a chip in the preparation of acrylic type lacquer systems comprising an amount from about 40 to about 85 parts by weight per 100 parts of the chip of a resin, the predominant proportion of which is a thermoplastic acrylic resin, an amount of from about 10 to about 30 parts by weight per 100 parts of the chip of an aftertreated channel black and an amount of organic copper compound sufficient to supply from about 0.5 parts to 5 parts of copper per 100 parts by weight of the black and an amount of from about 2 to about 20 parts by weight of an aromatic diamine per 100 parts of black.

TABLE 5

| Chip Formulation No. | Visual Rating | | Gloss | | Microscope Observations (Wet Spot Out at 65X) |
|---|---|---|---|---|---|
| | 1=most jet | Tone | Visual | Standard 60° Photovolt Gloss | |
| 707-A | | Brownest | Poorest (Hazy) | 65.2 | Extreme flocculation, appears to have poor dispersion. |
| 755-O | 8 | Brown | Poor | 85.4 | Fair to poor dispersion, soft flocculation throughout. |
| 754-O | 7 | do | Fair | | Soft flocculation throughout. |
| 756-O | 6 | Blue-Brown | Poor | 87.6 | Same as 755-O above. |
| 759-O | 5 | Blue | Fair | 90.4 | Fair to good dispersion, no flocculation initially. |
| 758-O | 4 | do | do | 89.0 | Same as 759-O above. |
| 753-O | 1 | do | Good | 95.0 | Excellent dispersion, no flocculation. |

What is claimed is:

1. A black acrylic type lacquer system comprising from about 10 to about 50% by weight of the lacquer of a resin the major constituent of which is a thermoplastic acrylic resin and from about 1 to about 6% by weight of the lacquer of an aftertreated channel black and an amount of an organic copper compound sufficient to supply from about 0.5 to about 5 parts of copper by weight per 100 parts by weight of black and an amount of from 8. The composition of claim 7 wherein the said copper compound is selected from the group consisting of copper oleate, copper naphthenate, copper acetate and mixtures thereof and the said diamine is p-phenylene diamine.

9. The composition of claim 8 wherein the said resin consists of a thermoplastic acrylic resin.

10. In the process for producing channel black pigmented lacquers comprising thermoplastic acrylic resins, the improvement which comprises dispersing the resin and substantially all of the channel black in the presence of an amount of an organic copper compound sufficient to supply from about 0.5 to about 5 parts of copper by weight per hundred parts by weight of black and an amount of from about 2 to about 20 parts by weight of an aromatic diamine per hundred parts of black.

11. The process of claim 10 wherein the amount of said compound is sufficient to supply from about 1 to about 4 parts of copper by weight per hundred parts of black and wherein the amount of said diamine is from about 5 to about 15 parts by weight of diamine per hundred parts of black.

12. The process of claim 10 wherein the said channel black is produced by the treatment of a channel black having an electron microscope particle diameter of at least 15 millimicrons and a porosity below about 200 with molecular oxygen to produce a product having a porosity between about 220 to about 400 and the subsequent treatment of said product with a substance chosen from the group consisting of nitric acid and nitric oxides to increase the volatile content thereof by at least about 40%.

13. The process of claim 11 wherein the said copper compound is selected from the group consisting of copper oleate, copper naphthenate, copper acetate and mixtures thereof and the said diamine is p-phenylene diamine.

14. The process of claim 13 wherein the said copper compound is copper oleate.

References Cited

UNITED STATES PATENTS

| | | | |
|---|---|---|---|
| 2,860,110 | 11/1958 | Godshalk | 260—17 |
| 2,949,445 | 8/1960 | Blake | 260—86.1 |
| 2,898,492 | 6/1961 | Sanderson | 260—17 |
| 3,037,955 | 6/1962 | Carman | 260—30.6 |
| 3,060,148 | 10/1962 | Evans et al. | 260—901 |

DONALD E. CZAJA, *Primary Examiner.*

R. A. WHITE, *Assistant Examiner.*